(12) United States Patent
Lautenschläger et al.

(10) Patent No.: US 7,007,511 B2
(45) Date of Patent: Mar. 7, 2006

(54) DEVICE FOR SUPPORTING A RIBBON OF GLASS

(75) Inventors: Gerhard Lautenschläger, Jena (DE); Christian Kunert, Mainz (DE); Andreas Morstein, Jena (DE)

(73) Assignee: Schott AG, Mainz (DE)

( * ) Notice: Subject to any disclaimer, the term of this patent is extended or adjusted under 35 U.S.C. 154(b) by 357 days.

(21) Appl. No.: 10/291,198

(22) Filed: Nov. 9, 2002

(65) Prior Publication Data

US 2003/0116910 A1 Jun. 26, 2003

(30) Foreign Application Priority Data

Nov. 20, 2001 (DE) .................................. 101 56 961

(51) Int. Cl.
*B56G 13/02* (2006.01)

(52) U.S. Cl. .................... 65/25.3; 65/90; 65/182.2; 65/253; 65/370.1

(58) Field of Classification Search ................ 65/25.3, 65/90–101, 182.2, 253–257, 370.1
See application file for complete search history.

(56) References Cited

U.S. PATENT DOCUMENTS

| 1,828,832 | A | * | 10/1931 | Drake | 65/182.2 |
|---|---|---|---|---|---|
| 2,478,090 | A | * | 8/1949 | Devol | 65/25.3 |
| 3,264,720 | A | * | 8/1966 | Mott | 65/182.2 |
| 3,506,422 | A | * | 4/1970 | Walters | 65/25.3 |
| 3,615,315 | A | | 10/1971 | Michalik et al. | 65/25.1 |
| 3,961,927 | A | * | 6/1976 | Alderson et al. | 65/25.1 |
| 4,081,260 | A | | 3/1978 | Glikman et al. | 65/25.1 |
| 5,090,987 | A | * | 2/1992 | Maltby, Jr. | 65/182.2 |
| 5,156,664 | A | * | 10/1992 | Maltby et al. | 65/182.2 |

* cited by examiner

*Primary Examiner*—Sean Vincent
(74) *Attorney, Agent, or Firm*—Pauley Petersen & Erickson

(57) ABSTRACT

A device for supporting a ribbon of glass, having at least one roller arranged in an area of an underside of the ribbon of glass. In order to keep a ribbon of glass as free as possible of mechanical damage during production, at least one support device is assigned to the roller. With an actuating device the roller or the support device can selectively be contacted with the underside of the ribbon of glass, wherein the support device is in contact, at least in some areas, with the underside of the ribbon of glass by way of a gas cushion. The rollers are then employed at the start of production or after a ribbon of glass has snapped off in order to transmit an advancement force to the ribbon of glass.

22 Claims, 1 Drawing Sheet

DEVICE FOR SUPPORTING A RIBBON OF GLASS

BACKGROUND OF THE INVENTION

1. Field of the Invention

This invention relates to a device for supporting a ribbon of glass, having at least one roller arranged in an area of an underside of the ribbon of glass.

2. Discussion of Related Art

A widely used method for producing flat glass is the float method. During this method, molten glass is poured on a bath of liquid tin, spreads on it and solidifies while being pulled out of a tin bath in an area of reduced temperatures. Fire-polished surfaces are created on the top and underside, in the process, which do not require further finishing.

The ribbon of glass is lifted off the surface of the bath at the cold end of the tin bath and is transported over a series of rollers to a cooling furnace, in which the glass is cooled to room temperature in a controlled manner and the tension is relieved during the process.

In a conventional manner, lifting the ribbon of glass off the tin bath is also performed by rollers. During the ongoing operation, these rollers are intended to lift the ribbon of glass gently off the tin bath, while the advancement force for the ribbon is provided by the rollers of the cooling furnace. However, at the start of production, or in case of an interruption which leads to the ribbon of glass being snapped off, the first rollers downstream of the tin bath have to provide this advancement force.

The first roller downstream of the tin bath in particular is subjected to relatively high temperatures, and soiling of this roller by particles from the tin bath dragged along is most extensive. Because of the high temperatures, some of these particles adhere to the surface of the roller, which results in damage to the underside of the newly formed ribbon of glass.

The replacement of the first rollers after shaping by an air cushion table is described for example in U.S. Pat. No. 3,615,315 and U.S. Pat. No. 4,081,260. Thus it is possible to prevent damage to the surface, because the ribbon of glass is guided over a surface without contacting it. However, one disadvantage of this method is that no drawing force can be exerted by this air cushion table.

SUMMARY OF THE INVENTION

As long as an intact ribbon of glass exists, the lack of drawing force from the rollers can be replaced by the drawing effect of the connected cooling furnace. At the start of production, or in case the ribbon of glass snaps off, the process is started with an extraordinary effort, because the new start of the ribbon of glass must be manually transported into the depth of the cooling furnace until a drawing effect is again achieved.

The snapping off of the ribbon of glass is an undesirable state which, however, does occur regularly and which must be controlled by process technology.

It is one object of this invention to provide a device of the type mentioned above but wherein a ribbon of glass can be transported without damage to the underside of the ribbon of glass, and which transmits an advancement force to the ribbon of glass, in particular at the start of production, or after the ribbon of glass has snapped off.

This object is achieved with at least one support device assigned to the roller. With an actuating device the roller or the support device can selectively be contacted with the underside of the ribbon of glass, wherein the support device is in contact, at least in some areas, with the underside of the ribbon of glass via a gas cushion.

The device in accordance with this invention can be employed when a ribbon of glass must be transported during a process, such as is required for example when rolling flat glass or in the course of the float method.

During the normal course of production, the ribbon of glass can be conducted contactless, or substantially contactless, by using support devices. In this way, damage to the underside of the ribbon of glass is prevented. In order to transmit an advancement force to the ribbon of glass when taking up production or production is started, the rollers can be contacted with the underside of the ribbon of glass by the actuating device. Then the ribbon of glass is transported with the aid of the rollers.

Particularly in connection with the float process, the ribbon of glass can be transported by the action of the rollers, in case the ribbon of glass snaps off until it is introduced far enough into the cooling furnace. Then the cooling furnace can again take up the drawing function. Once introduced, transport can then be transferred to the support device. It is also advantageous for the rollers to be produced more cost-effectively than before, because the rollers are only needed at the start of production and in the event that the ribbon of glass snaps off, and do not affect the production quality in this time.

In accordance with one embodiment of this invention, at least two rollers are arranged in the transport direction of the ribbon of glass, downstream of a glass production or glass processing unit. At least one support device is arranged in the transport direction upstream of the first roller, as well as between the rollers. The first support device, arranged in the transport direction directly after the glass processing unit, lifts the ribbon of glass out. The glass processing unit can be a float tank, for example. Because the lift-out process from the float tank takes place in a contactless manner, the ribbon of glass is not negatively affected mechanically in this delicate phase. One advantage of this construction is that the support devices have such dimensions that, if desired, existing installations can be retrofitted.

In one embodiment of this invention, in an area facing an underside of the ribbon of glass the support device has a gas-permeable layer which is connected to a pressure generator. In this embodiment, the gas-permeable layer has bores and/or slits for the gas to escape, or the gas-permeable layer is made of porous sinter metal, a porous ceramic material or graphite. If required, it is also possible to apply gas-permeable coatings of a precious metal to the gas-permeable layer, as well as other anti-adhesion or similar surface protection coatings.

In accordance with this invention, moist air, such as an inert gas, a reducing gas or gas mixture, or an $SO_2$-containing gas, is supplied to the gas-permeable layer for creating the gas cushion.

In connection with the use in the float process, in particular, it can be advantageous for the support device, connected directly downstream of the float tank, if an inert gas or a reducing gas is used there in order to prevent the oxidation of the tin contained in the float tank.

Preferably, the contact width on the top of the support devices, which extends in the transport direction and through which the gas flows, should be greater than 20 mm. With too narrow of a width, comparatively large gas flows are necessary.

In accordance with one embodiment of this invention, a heat exchanger is assigned to the support devices, or they have a heat exchanger. It is thus possible to prevent overheating of the support devices, and at the same time the supplied gas flow can be cooled.

In another embodiment of this invention, the actuating device adjusts the rollers with respect to the support devices, or the support devices with respect to the rollers, wherein the direction of actuation provides an offset opposite the direction of gravity.

If the rollers are only needed at the start-up or in the event of outages, the rollers can have a rough surface, at least in some areas.

Thus, a good transfer of force to the ribbon of glass is assured during roller operation. A structuring of the surface of the rollers can also be used as the roughness.

To achieve a floating effect already at comparatively low gas circulation, in accordance with this invention the upper surfaces of the support devices on which the gas film is formed are designed to be level, or slightly curved to correspond with the ribbon of glass resting on it.

The support devices usefully have a triangular or wedge shaped cross section in order to utilize the space available between the rollers as effectively as possible and to achieve as great as possible a width of the contact surfaces in the drawing direction along with the shortest possible distance between the rollers.

BRIEF DESCRIPTION OF THE DRAWINGS

This invention is described in greater detail in view of an exemplary embodiment represented in the drawings, wherein.

DESCRIPTION OF PREFERRED EMBODIMENTS

Figure 1:
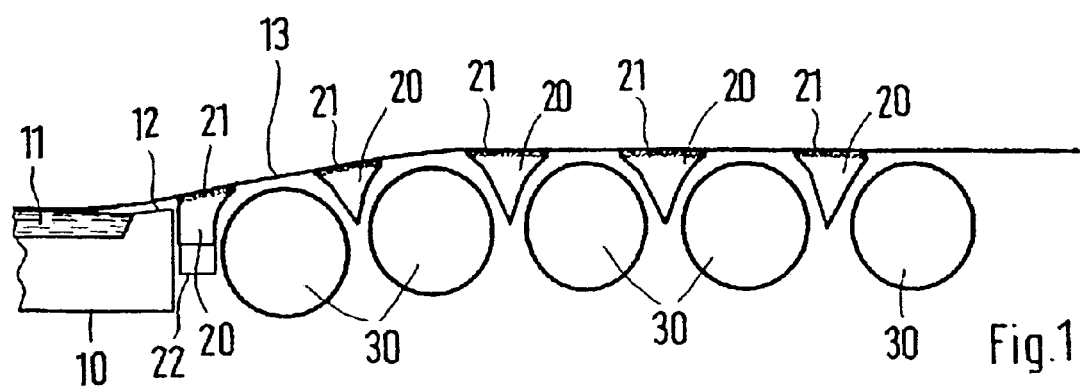
FIG. 1 is a lateral schematic view of a device for supporting a ribbon of glass.
Figure 2:
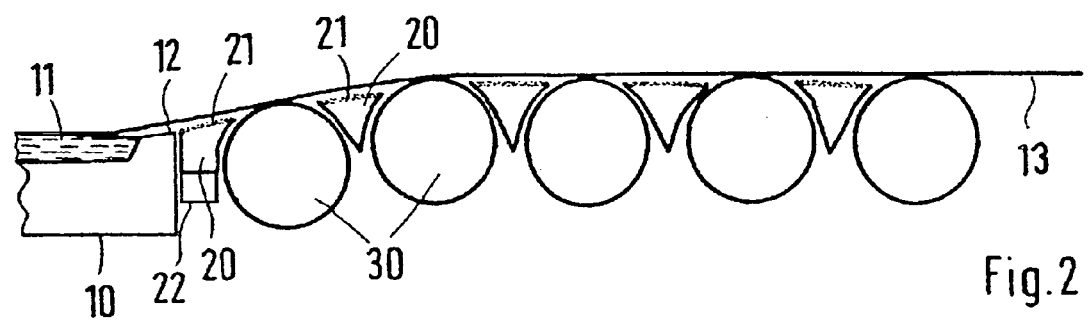
FIG. 2 is a lateral schematic view of the device in accordance with FIG. 1, but in a changed operational position.

A part of a glass processing unit, namely a float tank 10, of a flat glass production installation, is represented in FIG. 1. The float tank 10 contains a tin bath 11. An outlet edge 12 is arranged in the area of or near the end of the long side of the float tank 10. Liquid glass is poured on the tin bath 11 for producing float glass and is fed in near the area of the outlet edge 12 and is continuously cooled in the process, so that a solidified ribbon 13 of glass results. This must be lifted out of the float tank 10 over the outlet edge 10. Known rollers 30, which are also called lift-out rollers, are used for this purpose, in a conventional way. The ribbon 13 of glass runs up on these in such a way that a contact of the underside of the ribbon of glass with the outlet edge is prevented. As FIG. 2 shows, the ribbon 13 of glass is transported off, over the rollers 30, and is conveyed into the area of a connected cooling furnace, not shown in the drawings. In accordance with this invention, support devices 20 are employed in addition to the rollers 30. A first support device 20 is arranged directly following the outlet edge 12. Moreover, support devices 20 are also arranged between respective adjoining rollers 30 and as shown in the drawings, these are embodied to be in the form of triangles or wedges. Because of this geometric design it is possible to arrange the support devices 20 in a space-saving manner, and to line up the rollers 30 closely next to each other.

The support devices 20 have a gas-permeable layer 21 in an area facing the underside of the ribbon of glass, which constitutes an inflow side and a pressure buildup side facing the ribbon 13 of glass. The pressure buildup side can be embodied to be level or slightly curved, corresponding to the bending of the ribbon of glass. The pressure buildup side is arranged within the support devices 20 and is connected to a pressure generator via a distribution chamber. In the embodiment of the invention shown in FIGS. 1 and 2, a heat exchanger 22 is assigned to the first support device 20.

Gas can be conveyed into the area of the pressure buildup side by a pressure generator. It then forms a gas cushion between the gas-permeable layer and the underside of the ribbon 13 of glass. As shown in FIG. 1, the gas cushion supports the ribbon 13 of glass.

Different operational states are shown between FIGS. 1 and 2. The arrangement during the normal production state is shown in FIG. 1. But FIG. 2 shows the setting which is employed at the start of production or after the ribbon of glass has snapped off. A switch between the two operational states can be made with an actuating device. In the process, the actuating device performs a relative displacement between the rollers 30 and the support devices 20. In the course of this the support devices 20, shown in FIG. 1, or the rollers 30, shown in FIG. 2, can be selectively contacted with the underside of the ribbon of glass.

German Patent Reference 101 56 961.0-45, the priority document corresponding to this invention, and its teachings are incorporated, by reference, into this specification.

What is claimed is:

1. In a device for supporting a ribbon of glass, having at least one roller arranged in an area of an underside of the ribbon of glass, the improvement comprising:
at least one support device assigned to the at least one roller, wherein the at least one support device contacts the underside of the ribbon of glass by way of a gas cushion; and
an actuating device in combination with the at least one roller and the at least one support device, wherein the actuating device selectively and alternatively contacts the at least one roller or the at least one support device with the ribbon of glass.

2. In the device in accordance with claim 1, wherein at least two rollers are arranged in a transport direction of the ribbon of glass downstream of a glass processing unit, and a first support device is arranged in the transport direction upstream of a first roller of the at least two rollers and a second support device is arranged between the at least two rollers.

3. In the device in accordance with claim 2, wherein in the area facing the underside of the ribbon of glass the at least one support device comprises a gas-permeable layer, and the gas-permeable layer is connected to a pressure generator.

4. In the device in accordance with claim 3, wherein the gas-permeable layer comprises at least one of bores and slits for gas to escape.

5. In the device in accordance with claim 4, wherein the gas-permeable layer is made of one of a porous sinter metal, a porous ceramic material and a porous graphite material.

6. In the device in accordance with claim 5, wherein one of a moist air, an inert gas, a reducing gas, a gas mixture and an $SO_2$-containing gas is supplied to the gas-permeable layer for creating the gas cushion.

7. In the device in accordance with claim 6, wherein the at least one support device comprises a heat exchanger.

8. In the device in accordance with claim 7, wherein the actuating device at least one of adjusts the rollers with respect to the at least one support device or adjusts the at least one support device with respect to the rollers, wherein the direction of actuation provides an offset opposite the direction of gravity.

9. In the device in accordance with claim 8, wherein the rollers comprise in at least one area a rough surface.

10. In the device in accordance with claim 9, wherein the at least one support device arranged between adjoining rollers is embodied in a shape of one of a triangle and a wedge, in cross section.

11. In the device in accordance with claim 10, wherein on an outside facing the ribbon of glass the gas permeable layer comprises a curved surface geometry.

12. In the device in accordance with claim 11, wherein a contact width on a top of contact segments, through which gas flows and which extends in the transport direction of the ribbon of glass, is greater than 20 mm.

13. In the device in accordance with claim 1, wherein in the area facing the underside of the ribbon of glass the support device comprises a gas-permeable layer, and the gas-permeable layer is connected to a pressure generator.

14. In the device in accordance with claim 13, wherein the gas-permeable layer comprises at least one of bores and slits for gas to escape.

15. In the device in accordance with claim 14, wherein the gas-permeable layer is made of one of a porous sinter metal, a porous ceramic material and a porous graphite material.

16. In the device in accordance with claim 3, wherein one of a moist air, an inert gas, a reducing gas, a gas mixture and an $SO_2$-containing gas is supplied to the gas-permeable layer for creating the gas cushion.

17. In the device in accordance with claim 1, wherein the at least one support device comprises a heat exchanger.

18. In the device in accordance with claim 1, wherein the actuating device at least one of adjusts the rollers with respect to the at least one support device or adjusts the at least one support device with respect to the rollers, wherein the direction of actuation provides an offset opposite the direction of gravity.

19. In the device in accordance with claim 1, wherein the at least one roller comprises in at least one area a rough surface.

20. In the device in accordance with claim 1, wherein the at least one support device arranged between adjoining rollers is embodied in a shape of one of a triangle and a wedge, in cross section.

21. In the device in accordance with claim 1, wherein on an outside facing the ribbon of glass the gas permeable layer comprises a curved surface geometry.

22. In a device for supporting a ribbon of glass between a glass production or processing unit including a float tank and a cooling furnace, the device including more than one roller disposed in an area of an underside of the ribbon of glass, the improvement comprising:

a plurality of support devices, a first of the plurality of support devices disposed between a first of the more than one roller and the glass production or processing unit, and a second of the plurality of support devices disposed between the first of the more than one roller and a second of the more than one roller; and an actuating device in combination with the more than one roller and the plurality of support devices, wherein the more than one roller or the plurality of support devices are selectively brought into contact with the underside of the ribbon of glass by the actuating device, and the plurality of support devices contact the underside of the ribbon of glass by way of a gas cushion.

* * * * *